Jan. 28, 1941.  C. A. CRIMMINS  2,229,692
PATTERN MECHANISM
Filed Jan. 28, 1939   5 Sheets-Sheet 5
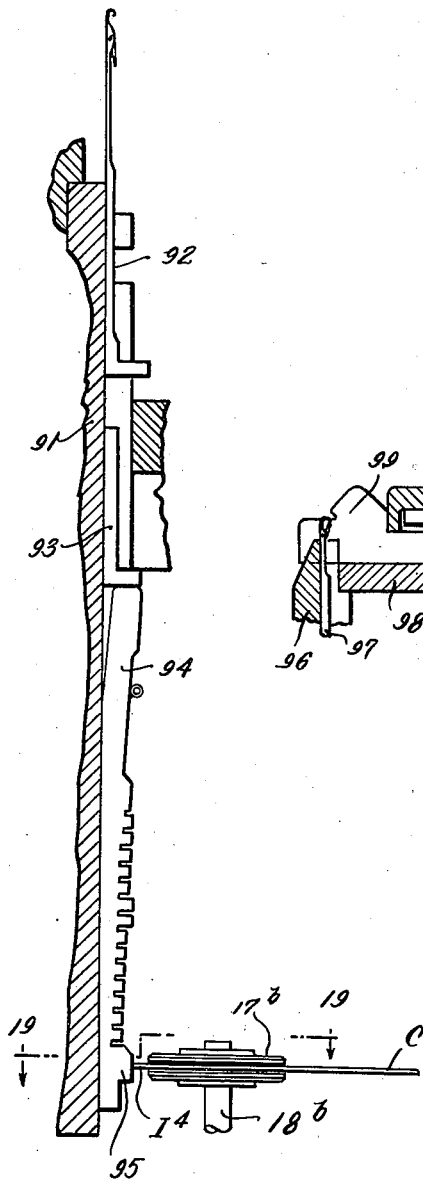
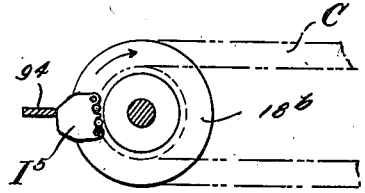
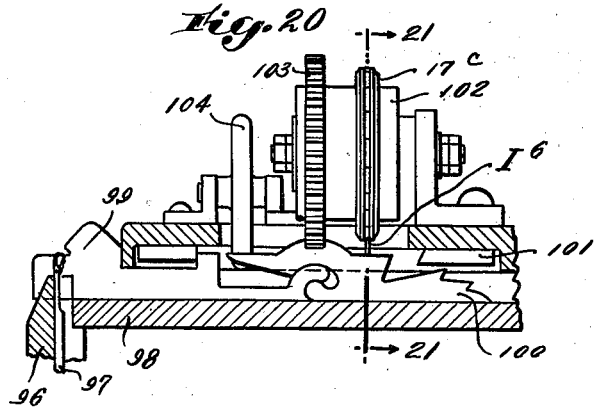
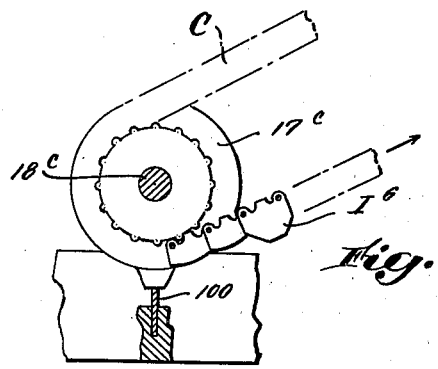
Inventor,
Cornelius A. Crimmins,
by Roberts Cushman & Woodbury
Attys.

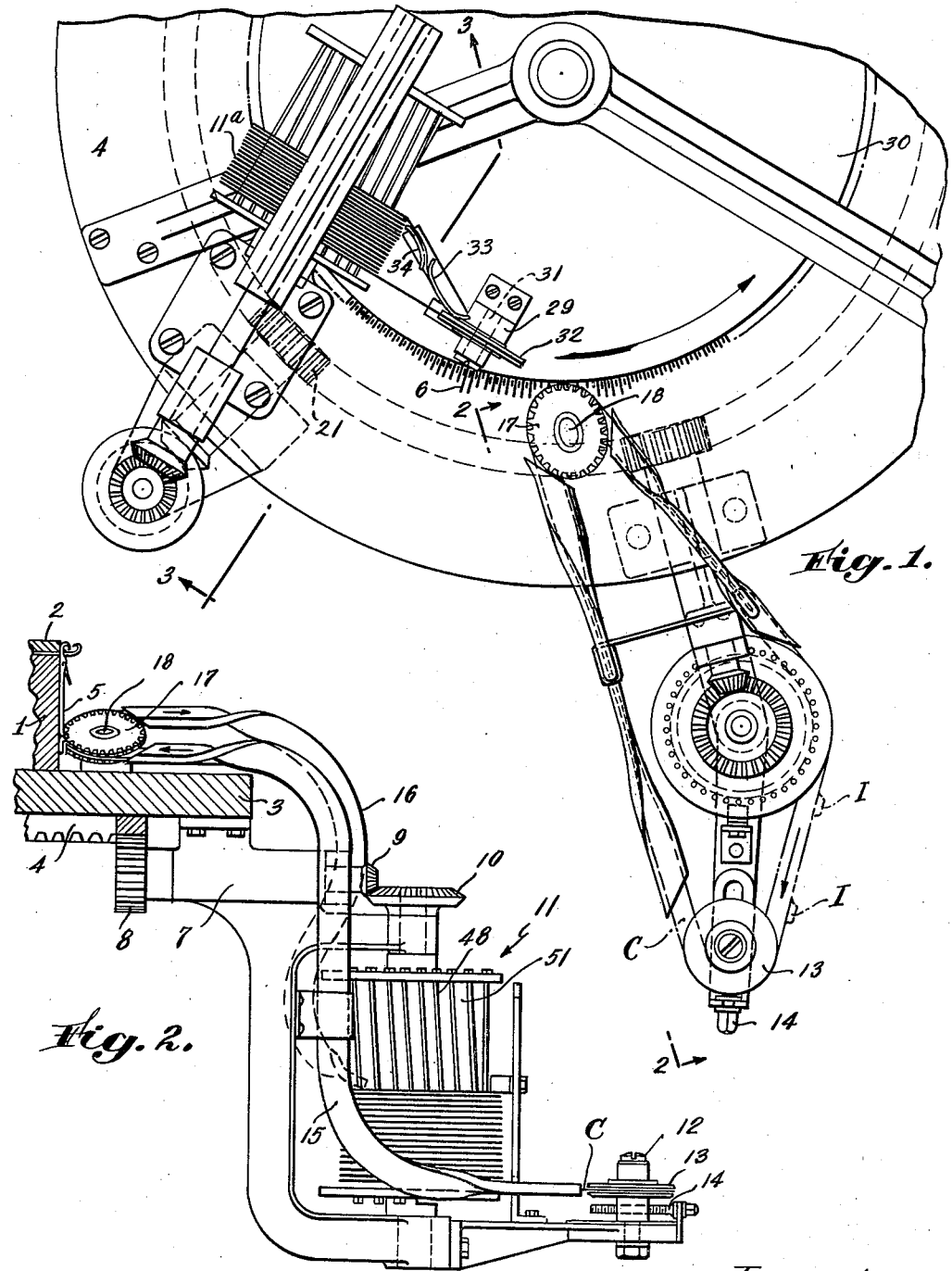

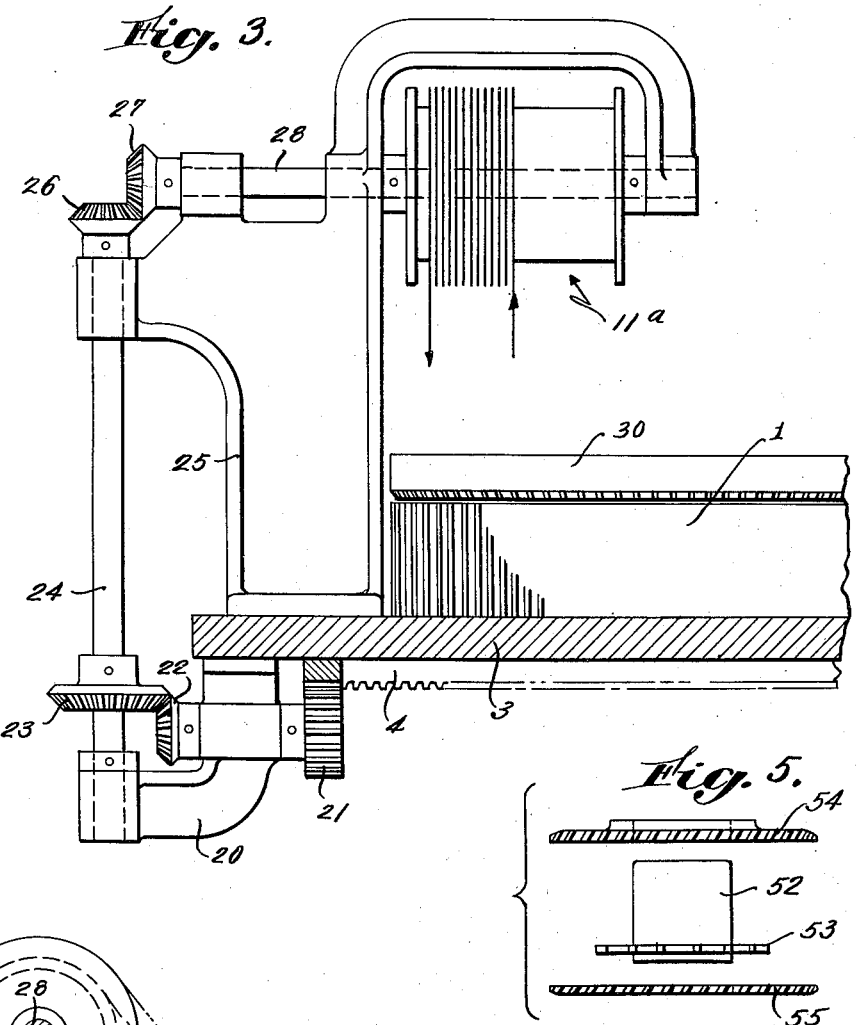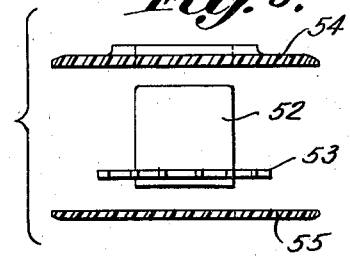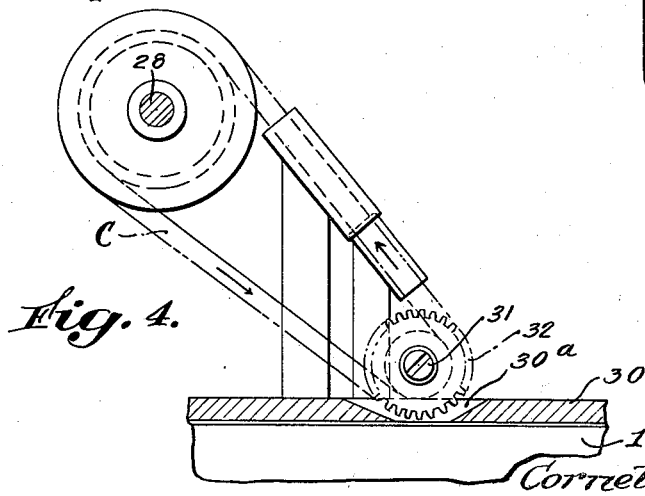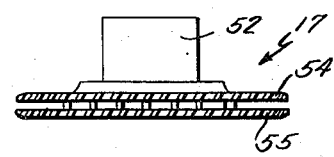

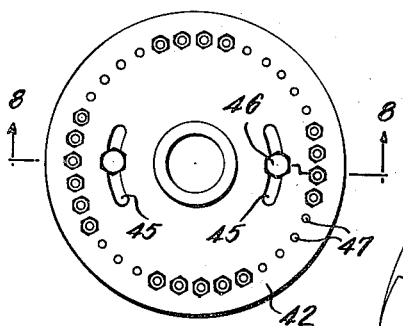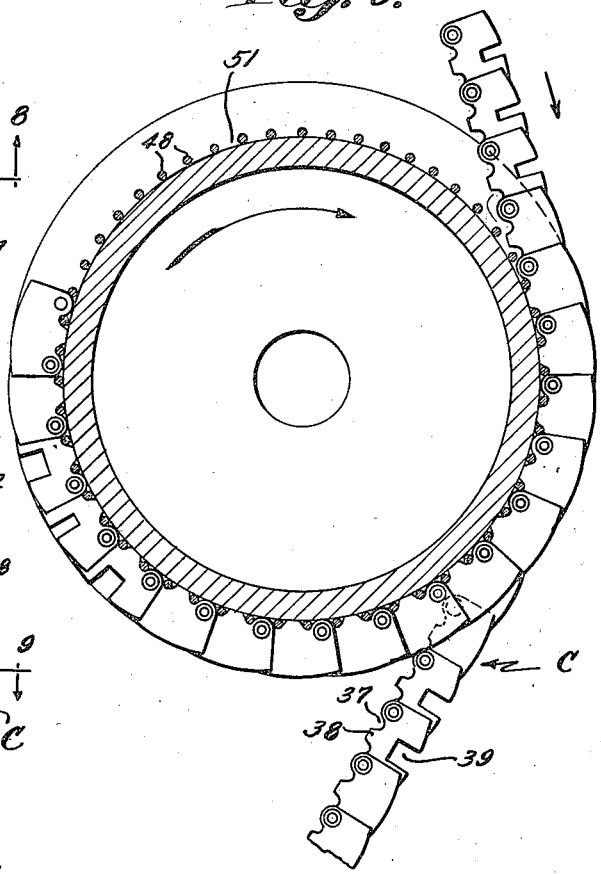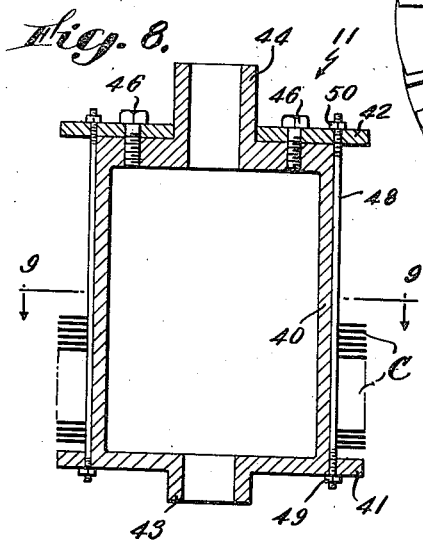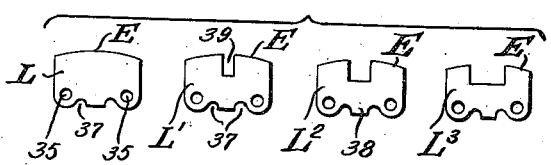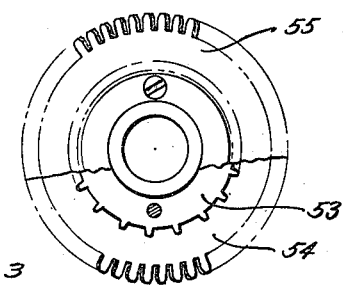

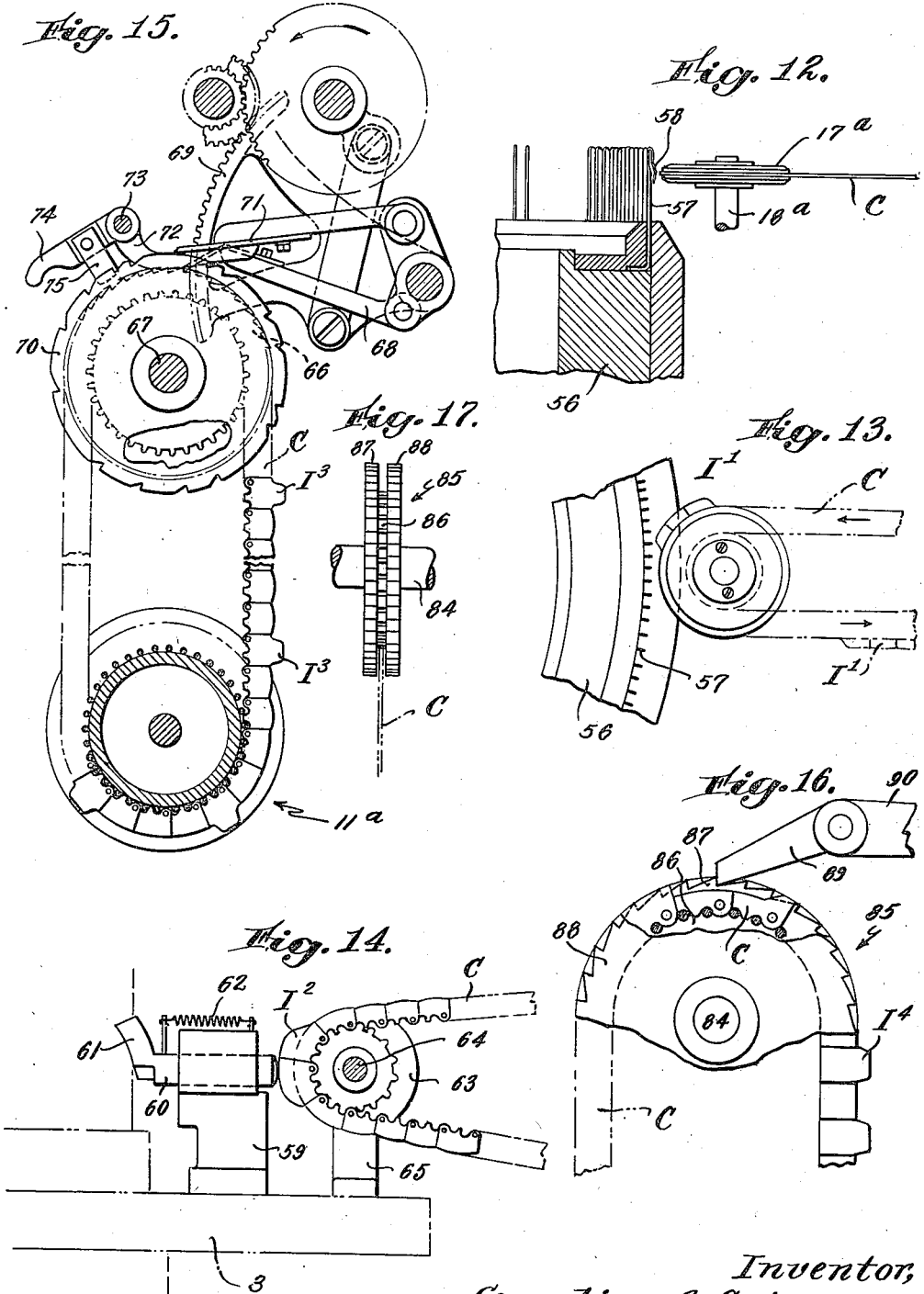

Patented Jan. 28, 1941

2,229,692

UNITED STATES PATENT OFFICE 2,229,692

PATTERN MECHANISM

Cornelius A. Crimmins, Stoughton, Mass.

Application January 28, 1939, Serial No. 253,298

26 Claims. (Cl. 66—156)

This invention pertains to that class of apparatus commonly known as pattern mechanism designed to determine and/or control the operation or sequence of operations of a machine or the like whereby to cause such machine to perform a variable cycle or sequence of steps in accordance with a prearranged or predetermined set-up of the pattern mechanism. Jacquard and Dobbey mechanisms, such as are commonly used for selective warp shedding or shuttle selection in a loom, or the pattern drum or chain of a hosiery knitting machine, are well known examples of pattern mechanisms of this general class.

Although pattern mechanisms are most commonly employed in textile manufacture, mechanism of this general type is employed in association with other kinds of machinery where a variation in the timing or other mode of functioning of the operative instrumentalities of the machine is to be brought about automatically and while, herein, the invention is specifically illustrated and described with reference to its utility in connection with textile machinery, it is to be understood that the invention is not limited to such use or environment.

Heretofore, the field of application of such pattern mechanisms has been somewhat restricted by reason of limitations of space. Constructions commonly employed in such pattern mechanisms necessitate a very substantial amount of space, particularly if the pattern is to be of any considerable length, and in most such prior devices the pattern elements (lugs, pins, needle-receiving holes, etc.) are constrained always to move in substantially the same planes so that in many instances it is difficult, if not impossible, to apply them for direct operation at the desired point of action. When a mutable link chain constitutes the pattern device, the links being so united as to permit them to be separated at will, the means of union ordinarily employed permits considerable lost motion which tends to become cumulative in a chain of substantial length, thus precluding accurate direct control of small, delicate or closely spaced parts by the chain lugs or other indications. Moreover such chains are usually clumsy and difficult to drive with the accuracy of timing which is essential for the direct control of small and delicate parts of a machine.

The principal object of the present invention is to provide pattern mechanism capable of application to a much wider field of utility than pattern mechanisms of usual type, but which at the same time may be set up to give a pattern of almost any desired length. A further object of the invention is to provide pattern mechanism which may readily be made of so accurate a construction and which may be so nicely timed as to permit its use for direct control of even the smallest and most delicate machine parts.

A further object of the invention is to provide a pattern device in which a mutable link chain is used as a carrier for pattern lugs or other indications, but which is so devised that it may be flexed in planes at right angles to each other thereby to permit the lug-carrying links to approach the desired point of action along a path which may, if necessary, be curved in different planes.

A further object of the invention is to provide a pattern chain in which the links are removably connected by means which substantially eliminates lost motion and thus insures accuracy of operation.

A further object of the invention is to provide pattern mechanism wherein the inactive part of the pattern chain may be stored in very small compass thus permitting the use of a much longer chain than would be possible under many conditions with chains of ordinary construction.

A further object of the invention is to provide rotary storage means for the inactive portion of the pattern chain so devised as to be capable of storing a greater or lesser amount of chain as desired, but which is so devised as to insure its accurate rotation in time with the machine whose action is controlled by the pattern mechanism.

A further object of the invention is to provide a pattern mechanism applicable, for example, to a knitting machine and operative for such purposes as directly to control the closing of the beards of spring needles; to determine the operation of patterning sinkers or web holders; to determine the selective operation of needles or needle jacks; to control the operation of yarn-changing guides; to determine the movement of needle actuating cams between active and inactive position; or to determine the step-by-step movement of a pattern cam drum or the like.

Further objects and advantages of the invention will be pointed out in the following more detailed description and by reference to the accompanying drawings wherein Fig. 1 is a fragmentary diagrammatic plan view of a circular rib knitting machine showing pattern mechanism embodying the present invention arranged to control the operation of individual needles in both the cylinder and dial;

Fig. 2 is a diagrammatic vertical section substantially in the plane of line 2—2 of Fig. 1;

Fig. 3 is a fragmentary diagrammatic section substantially on the line 3—3 of Fig. 1, certain parts being omitted;

Fig. 4 is a fragmentary diagrammatic vertical section substantially on the line 4—4 of Fig. 1;

Fig. 5 is a composite view showing disassembled constituent parts of one form of chain-presenting wheel;

Fig. 6 is an edge view of the assembled chain-presenting wheel;

Fig. 6a is an end elevation of the wheel of Fig. 6;

Fig. 7 is a plan view of a chain storage and driving drum;

Fig. 8 is a vertical section substantially on the line 8—8 of Fig. 7;

Fig. 9 is a horizontal section to larger scale on the line 9—9 of Fig. 8;

Fig. 10 is a composite plan view illustrating a plurality of disassembled chain links made in accordance with the present invention;

Fig. 11 is a longitudinal section showing a portion of a pattern chain in accordance with the present invention and with the links assembled;

Fig. 12 is a diagrammatic vertical section showing the present invention as employed for the direct selective control of the beards of a spring needle knitting machine;

Fig. 13 is a plan view of the parts shown in Fig. 16;

Fig. 14 is a diagrammatic elevation showing the present invention applied for determining the in-and-out motion of a needle actuating cam of a knitting machine;

Fig. 15 is a diagrammatic elevation, partly in vertical section, illustrating the improved chain of the present invention employed as the main pattern chain of a knitting machine;

Fig. 16 is a fragmentary elevation, partly in vertical section, showing the improved pattern chain as arranged to control the operation of a pawl for driving a rotary part;

Fig. 17 is an edge view of the combined chain-guiding and ratchet wheel of Fig. 16;

Fig. 18 is a fragmentary vertical section showing a needle cylinder provided with needle-selecting jacks, and having pattern mechanism embodying the present invention arranged for selectively actuating the jacks;

Fig. 19 is a fragmentary horizontal section on the line 19—19 of Fig. 18;

Fig. 20 is a fragmentary vertical section through the sinker bed of a knitting machine showing pattern mechanism in accordance with the present invention arranged for selective actuation of sinker jacks; and Fig. 21 is a fragmentary section on the line 21—21 of Fig. 20.

In Figs. 1 to 6 of the drawings the invention is shown in operative association with a circular rib knitting machine and arranged for selective control of the operation of the cylinder and dial needles respectively, thereby to permit the production of fabrics having special stitches, for instance tuck stitches, drop stitches or the like, either for the purpose of imparting a special texture to the fabric as a whole or for the production of pattern effects. It is to be understood that the knitting machine illustrated in Figs. 1 to 6 inclusive may be of any conventional type and that only such portions are herein diagrammatically illustrated as is necessary to show how the present invention is operatively associated therewith. It is further to be understood that while, as shown in Figs. 1 to 6 inclusive, the invention is shown as applied to a circular rib knitting machine having both cylinder and dial, it is of broader applicability and useful for controlling the needles either in the cylinder or dial independently, and that the invention is also equally applicable to the control of the needles of a flat bed or "straight" knitting machine.

Referring to these figures of the drawings, the numeral 1 designates the cylinder and 2 the dial of the knitting machine. The cylinder is mounted upon the stationary bed 3 and is provided with the annular gear 4 (Fig. 2) by means of which it is rotated. The cylinder, as usual, is provided with vertical slots in its outer peripheral surface for the reception of the cylinder needles 5, here shown as latch needles, while the dial 2 is provided with radial slots in its upper surface for the reception of the dial needles 6.

In accordance with the present invention the bed plate 3 supports a bracket 7 providing bearings for a horizontal shaft furnished at its inner end with a pinion 8 which meshes with the gear 4 whereby the shaft is turned in accurately timed relation to the rotation of the needle cylinder. At its outer end the shaft which carries the pinion 8 is provided with a beveled pinion 9 which meshes with a beveled gear 10 on the upper end of a vertical shaft turning in bearings provided in the bracket 7 and on which is fixedly mounted the rotary storage drum 11 hereinafter more fully described.

Preferably the bracket 7 also supports a vertical stub shaft 12 on which is mounted a guide wheel 13 having a vertically narrow peripheral groove. This guide wheel is preferably adjustable in a direction approximately radial of the needle cylinder by means of an adjusting screw 14 and is designed to constitute an idler for the pattern chain hereinafter described, by means of which slack in the chain may be taken up.

The bracket 7 also supports suitable fixed guides 15 and 16 for directing the pattern chain C toward the point at which it performs its intended function and for guiding the chain, after it has performed its patterning function, back toward the storage drum 11. These guides 15 and 16 are preferably of flat tubular form in cross section and they may be curved in any desired direction for guiding the chain in its desired path, since, as will be pointed out more fully hereinafter, the chain is flexible and capable of bending in directions at right angles to each other. Thus it is possible, if necessary, to curve the guides 15 or 16 in different planes so as to present the chain at the desired point of operation, even though it may be necessary that the chain follow a sinuous or twisting path in reaching such point.

As illustrated particularly in Figs. 2, 5 and 6, the chain is controlled and operatively presented at its point of action by means of a guide wheel 17 which may be mounted upon a fixed stub shaft 18 carried by the bed plate 3. The axis of the shaft 18 is so disposed that the plane of the guide wheel 17 is inclined to the bed plate 3 in the same way as the so-called "trick" wheels commonly employed in knitting machines for raising needles, for example for selective engagement with knitting cams. As illustrated in Figs. 5, 6 and 6a the guide wheel 17 comprises a hub portion 52 to which is fixed a sprocket disk 53 having spaced teeth designed to engage recesses in the inner edges of the links of the pattern chain C. The guide wheel 17 also comprises a pair of peripherally toothed disks 54 and 55 which are disposed at opposite sides of the sprocket disk 53, the disks 54 and 55 being spaced apart a distance substantially equalling the transverse thickness of the pattern chain. The teeth of the disks 54 and 55 are so inclined that they may properly mesh with the lower or tail portions of the needles 5, thereby insuring accurate timing of the wheel 17 with reference to the series of needles 5 as the cylinder rotates.

As illustrated in Figs. 1 and 3 the bed plate 3 is also provided with a downwardly directed bracket 20 providing a bearing for a horizontal shaft having a pinion 21 at its inner end which meshes with the annular gear 4 so that the shaft with its pinion is turned in accurately timed relation to the cylinder 1. At its outer end this shaft is furnished with a beveled pinion 22 which meshes with a beveled gear 23 at the lower part of a shaft 24 which is journaled at its lower end in a bearing in the bracket 20 and at its upper end in a bearing in a bracket 25 mounted on the top of the bed plate 3. At its upper end the shaft 24 has a beveled pinion 26 which meshes with a beveled pinion 27 on a horizontal shaft 28 mounted in bearings in the bracket 25 and which supports the chain storage drum 11ª in a position overhanging the dial 2. A bracket 29 (Fig. 1) is mounted on the top of the dial cam-cap 30 and supports a horizontal stub shaft 31 which is non-radial as respects the dial and on which turns the chain-positioning wheel 32 which may be of substantially the same construction as the wheel 17 above described. The dial cam-cap 30 is furnished with a slot 30ª (Fig. 4) for the reception of the lower part of the wheel 32, and the peripheral teeth of the latter wheel engages the needles within the dial so that the wheel 32 is turned in accurately timed relation to the series of needles in the dial. Suitable guides 33 and 34 may be provided for guiding the chain in its movement between the storage drum 11ª and the chain-presenting wheel 32, such guides being suitably supported in fixed position upon the dial cam-cap.

In Figs. 7 to 11 inclusive the improved pattern chain and storage drum of the present invention are illustrated in greater detail. In accordance with this invention the pattern chain C consists of a series of links L, L¹, L², L³ etc., each link preferably being more or less rectangular in contour, as illustrated in Fig. 10. Each link is made of a stiffly flexible and resilient material such as sheet steel. Steel having approximately the thickness and other general characteristics of that employed in making safety razor blades is well suited for this purpose, and the links may be stamped from this material by the use of appropriate dies. If desired all of the links may originally be made of like contour, that is to say, "blank" links, and thereafter selected links may be shaped to particular contours for patterning purposes, as for example by cutting out portions from the blank link. On the other hand, if preferred, the patterning or special links may be cut to their final shape directly from the sheet material without first forming the blank links, if preferred.

As illustrated in Fig. 10 each of the links L etc. is preferably of the same shape at its inner edge. Thus each of these links is furnished adjacent to its opposite side edges, respectively, and near its inner edge with spaced openings 35, and also with a pair of spaced notches or recesses 37 separated by an intermediate tooth 38. As illustrated in Figs. 9 and 10, the special or patterning links have pattern indications in the form of notches or recesses 39 of different predetermined widths or depths. While the links L¹, L² and L³ are here shown as having single recesses 39, merely differing in width, it is obvious that any given link may be furnished with two or more recesses and that the recesses 39 may be of any desired shape or depth in accordance with the type of instrumentality which is to be engaged by the pattern indication. While the recesses 39, as illustrated in Fig. 10, may be regarded as the pattern "indications," it is equally proper to consider the metal of the link at each side of the recess as the pattern indication, and it is further to be understood that, considering the edge E as the normal edge of the link, pattern indications projecting beyond such edge may take the form of integral lugs of any desired shape or length and in any desired number projecting beyond the normal edge E of the link.

The links L, L' etc. are arranged with their adjacent end portions overlapping, as illustrated in Fig. 11, and these overlapping ends are then pivotally united by means of suitable connecting elements 36, preferably tubular rivets. As shown in Fig. 11, successive links of the chain are arranged in step formation which is readily possible, without unduly thickening the chain, by reason of the transverse flexibility of the individual links, but it is contemplated that successive links may be arranged in staggered relation throughout the length of the chain, if preferred.

The rivets 36, particularly if tubular rivets, may readily be inserted by means of a hand actuated rivet setting device, and if desired in order to secure proper freedom of pivotal movement of the links, a very thin washer, for example of paper, may be interposed between the contacting surfaces of adjacent links and may then be removed after the completion of the rivet setting operation, for example by a carbonized process or the like, so as to provide a predetermined amount of freedom between the parts.

By the employment of tubular rivets as a connecting means it is possible substantially to eliminate lost motion between the parts and at the same time it is made possible readily to take out any desired link for replacement by another, since such a tubular rivet is very readily removable by the use of a proper punch without damaging the links. It is thus possible to make a mutable link pattern chain in which the links are so pivotally connected as substantially to avoid lost motion, while at the same time permitting ready removal and replacement of links in setting up a new pattern or in varying a pattern already set up or for removing a broken link when necessary.

It will be evident that a chain thus constructed is very narrow transversely and as the links are individually flexible the chain is quite flexible transversely of its width. Thus such a chain may not only bend in the usual manner about a guide wheel over which it is trained, but it may also bend transversely so as to follow any desired path and so as to permit it to be helically coiled in very small and compact compass.

This transversely flexible chain is very well adapted for use with a storage drum which supports the major part of the inactive portion of the chain and onto which the chain is continuously fed and from which the chain is likewise continuously delivered. Such a storage drum is illustrated in detail in Figs. 7, 8 and 9. As illustrated, this drum is of more or less spool shape, comprising the cylindrical barrel 40 and the head or flange members 41 and 42 respectively. At its opposite ends the drum is provided with hub members 43 and 44 designed to receive the shaft on which the drum is mounted and to which it is fixed, for example by a set screw or key. At least one of the heads, for example the head 42, is preferably arranged so that it may be rotated about the axis of the shaft relatively to the other head. Thus, as shown, the head 42 is provided with arcuate slots 45, designed to receive bolts 46 by means of which the head 42 is attached to the body portion of the drum. By loosening these bolts the head 42 may be rotated, more or less, relatively to the other head 41 and then secured in position by tightening the bolts 46.

Each of the heads 41 and 42 is furnished with a circular series of openings 47. The diameter of the circle constituted by the centers of the series of openings 47 is slightly greater than that of the outside diameter of the barrel portion 40 of the drum. The openings 47 in the two heads are designed to receive the opposite end portions of a series of rods 48 which extend along, preferably in substantial contact with, the outer surface of the barrel portion 40 of the drum and through the openings in the respective heads. These rods are preferably screw-threaded adjacent to their opposite ends for the reception of the nuts 49 and 50, by means of which they are held in place, preferably under some tension. These rods 48 are preferably of a stiffly resilient material such as steel and are spaced apart equally peripherally of the barrel 40, thus defining between them a series of longitudinal channels 51. The rods are spaced from each other a distance substantially equalling the distance between the recesses 37 at the inner edge of each of the chain links, and the channels 51 are of such width as to receive the tooth 38 which projects from the inner edge of each chain link.

As above described the drum 11 is designed to receive the major part of the inactive portion of the chain which is coiled in a helical coil about the barrel portion 40 of the drum. In order that the recesses 37 at the inner edges of the chain links may always fit properly over the rods 47 of the drum, it is necessary that the rods be disposed so that each rod forms a portion of a turn of a very steep pitched helix. This disposition of the rods is very easily accomplished by the use of the rotary head 42 on the drum, it being merely necessary to loosen the nuts 50 for example, and the bolts 46, and then to turn the head 42 slightly until the rods 48 are caused to assume the requisite inclination so as to accommodate the recesses 37 of the chain links as the chain is piled up one coil after another longitudinally of the drum. After the rods have been properly adjusted the nuts 50 and bolts 46 are tightened, thus providing a drum having in effect steep pitched helical ribs on its peripheral surface. With this arrangement the entire mass of the inactive portion of the chain which is coiled about the drum is definitely controlled, since each link, throughout the entire coiled portion of the chain, is definitely positioned by the engagement of the rods 48 with the recesses 37 and the entrance of the teeth 38 of the chain links into the channels 51 of the drum.

Manifestly the pitch of the rib-forming rods 48 must vary with the dimensions of the chain being used, particularly upon the transverse thickness of the chain links, and thus it is desirable to provide a drum having provision for changing the pitch of its ribs to accommodate chains of different dimensions.

As illustrated in Figs. 1 to 6, as above referred to, the chain C is designed for the direct pattern control of the needles of both the dial and cylinder of the knitting machine. The operation of controlling the needles is similar to that which is performed by the usual trick wheel, but since the trick wheel is replaced by a chain which may be of very substantial length, the device is thus capable of producing a pattern of greater complication than is possible with the ordinary trick wheel. As shown in Figs. 1 and 2 the chain C passes around the idler and take-up wheel 13 and then along the fixed guideway 15 to the chain-presenting wheel 17. As the chain passes about this wheel pattern lugs I on the chain links may engage the needle butts and raise selected needles or alternatively pattern recesses 39 may, on the other hand, be arranged selectively to allow needles to remain at a low level in the same way that they are raised or allowed to remain down by usual trick wheels. After passing the active position, each chain link moves along the fixed guide 16 and onto the drum 11 about which the inactive portion of the chain is coiled in a series of helical turns, which may occupy more or less of the length of the drum. The drum is slowly rotated in time with the motion of the needle cylinder and as the chain is wound on the upper part of the drum it is simultaneously unwound from the lower part of the drum and passes to the guide wheel 13 from which it again passes to the fixed guide 15. In like manner the chain which controls the dial needles passes about the chain-presenting wheel 32 where its pattern indications act upon the dial needles, and then moves along the fixed guides 33 and 34 and onto the drum 11ª, this drum also being driven in accurate timed relation to the needle cylinder.

By reason of the transverse flexibility of the chain it is possible to cause it to approach the position at which its pattern indications perform their operative function, even though in so approaching this point it must twist or make sharp bends in a direction transverse to its width. Moreover by reason of the narrowness of the chain it is possible to store a very great length of the chain upon a storage drum of reasonable dimensions so that a long pattern may be used without requiring an undue amount of space for the pattern chain, and as the chain is very light in weight, the power consumed in driving it is of little consequence.

As just suggested, the improved pattern chain may be used in substitution for a trick wheel for controlling latch needles disposed in slots in a knitting machine cylinder or dial. On the other hand, this chain may be used in other ways for the control of the knitting instrumentalities of a knitting machine. For example, in Figs. 12 and 13 the chain is shown as arranged for the direct control of the beards of spring beard needles. In these views the knitting machine cylinder is shown at 56 and the needles at 57, each needle having the spring beard 58. In this instance the chain-presenting wheel 17ª, which may be in general similar to the wheel 17 above described, but which need not be provided with teeth at its edge, is mounted to turn on a shaft 18ª having its axis parallel to that of the cylinder 56. In this instance the chain links are provided with indications I$^1$, taking the form of lugs projecting beyond the normal outer edges of the links. These indications I$^1$ are arranged in any desired order along the length of the pattern chain and are so disposed with reference to the needle beards that when a pattern indication I$^1$ is caused to pass about the wheel 17$^a$, such indication will close the beard of any needle which may be passing at this particular time. Thus by proper disposition of indications I on the chain links, the beards 58 of the needles may be closed in accordance with a predetermined selected arrangement, thereby to provide a pattern effect in the fabric.

The improved chain may also be used for the direct control of other knitting instrumentalities, for example an adjustable needle controlling cam. As shown in Fig. 14 the bed plate 3 of the knitting machine carries a bracket 59 forming a bearing for the shank portion 60 of a cam 61. This cam is normally urged outward away from the needle cylinder by means of a spring 62, but when moved inwardly toward the needle cylinder, performs some predetermined operation upon the needles, for example, it may elevate them from an inactive path into a path where they are acted upon by the usual knitting cams. In accordance with the present invention the inward movement of the needle cam 61 is directly accomplished by the use of pattern lugs or indications I$^2$ carried by certain links of the pattern chain C. This chain passes around the chain-presenting wheel 63 which is mounted on a shaft 64 supported by a bracket 65 mounted on the bed plate 3, the wheel being so positioned with respect to the shank 60 of the cam 61, that when a chain indication I$^2$ passes about the wheel 63 it engages the end of the shank 60 and pushes the cam 61 inward to operative position.

In Fig. 15 the improved chain C is illustrated as taking the place of the usual main pattern chain of a circular knitting machine, such for example as illustrated in the patent to Scott No. 1,152,850, dated September 7, 1915. Thus as illustrated in Fig. 15 the chain C is trained about a chain-presenting wheel 66 mounted to turn freely on the shaft 67 which carries the main pattern drum of the machine. The presenting wheel 66 is furnished at its edge with a series of ratchet teeth designed to be engaged by a pawl 68 which is secured to the usual sector gear 69 of the knitting machine, the pawl 68 thus stepping the wheel 66 forward one tooth for each four revolutions of the knitting machine cylinder. Fixed to the main pattern shaft 67 is a toothed wheel 70 which may at times be engaged by a pawl 71 also secured to the sector gear 69. Normally the pawl 71 is held out of engagement with the teeth of the wheel 70 by a pawl lifter 72 pivoted at 73, and having a counterbalance weight 74 which tends to raise it and thus to raise the pawl 71. The pawl lifter is also furnished with an actuating lug 75 which is so arranged as to lie in the path of pattern indications I$^3$ carried by the pattern chain C. Thus whenever one of these indications I$^3$ engages the member 75, the pawl lifter 72 is swung downwardly, thus allowing the pawl 71 to engage a tooth of the wheel 70 and thereby cause the pattern drum shaft 67 to turn forwardly one step. The inactive portion of the chain C is wound helically about the storage drum 11$^a$, as above described, and by reason of the construction of the chain and drum it is thus possible to employ a chain of very considerable length without occupying an undue amount of space.

The improved chain may also be used for the direct control of a driving pawl, as illustrated for example in Figs. 16 and 17. In these views the shaft 84 carries the ratchet wheel 85, the latter comprising a peripherally toothed disk 86 designed to cooperate with the inner edges of the links of the chain C to prevent slippage of the links with reference to the disk. The wheel 85 also comprises a pair of disks 87 and 88 disposed at opposite sides respectively of the disk 86 and secured to the latter, the disks 87 and 88 having peripheral ratchet teeth designed for engagement by a pawl 89 of a width such as to extend from one of the ratchet disks to the other and to bridge the disk 86. This pawl 89 may be carried by any suitable part 90 to which a motion of oscillation is imparted, whereby the pawl 89, by engagement with the teeth of the disks 87 and 88, tends to step the wheel 85 forwardly one tooth for each movement of the pawl. However, when a pattern indication I$^4$, carried by the chain, arrives beneath the pawl 89, the latter will be raised out of engagement with the ratchet teeth and thus the further movement of the wheel 85 and the chain will be stopped until the wheel is advanced by some extraneous means so as to carry the pattern lug I$^4$ from beneath the pawl 89.

In Figs. 18 and 19 a further utility of the improved chain is illustrated wherein the chain is designed to take the place of a jack-controlling trick wheel such as is illustrated, for example, in the patent to Page No. 1,920,427, August 1, 1933. In the arrangement disclosed in the patent just above referred to the needle cylinder 91 carries the needles 92, the needle-lifting jacks 93, and the needle-selecting jacks 94, the latter being designed to rock, so that their lower portions may move in toward or out from the surface of the needle cylinder. In accordance with the present invention the pattern chain C passes around the chain-presenting wheel 17$^b$ mounted on the shaft 18$^b$, parallel to the axis of the needle cylinder, the wheel 17$^b$ being disposed in the horizontal plane of the lower butt 95 of the selecting jack 94. With this arrangement, pattern indications I$^5$, carried by the chain, directly engage the outer edge of the butt 95 and thus push the lower portion of the selecting jack 94 inwardly so as to escape the usual elevating cam. Thus whenever a pattern indication I$^5$, carried by the chain, is brought into operative position, the corresponding jack or jacks are moved inwardly,—the chain thus performing a function similar to that of the cylindrical trick wheel or drum commonly used for the purpose. However, by the use of a chain which takes up but little room at the point where it is actively operative, it is possible to obtain substantially the same capabilities in pattern control that are obtainable by the usual trick wheel drum, but without occupying so much space in the vicinity of the needle cylinder as does the latter, thus leaving the machine freer for observation of its operation and for adjustment of its various parts.

A still further utility of the invention is illustrated in Figs. 20 and 21 wherein the improved chain is shown as employed for the direct control of sinker selecting jacks such as disclosed in the patent to Lombardi No. 2,025,463, December 24, 1935. In this arrangement the needle cylinder 96 carries the needles 97 and the bed 98 carries the patterning sinkers 99. These sinkers are controlled in their in-and-out movements by selecting jacks having tail portions 100 which, when raised, are brought into the path of the cam 101 whereby the jack with its associated sinker is advanced to operating position. The selection of the jacks 100, in accordance with the present invention, is accomplished by means of the pattern chain C which passes about the presenting wheel 17c, turning on the shaft 18c supported by the cam cap of the sinker bed. The wheel 17c has a hub 102 to which is secured a toothed wheel 103, the teeth of which mesh with the series of jacks 100 so that the drum 102 and the wheel 17c are turned in exact time with the rotational movement of the series of sinkers. With this arrangement, when one of the pattern indications $I^6$ passes around the wheel 17c, it engages the edge of a corresponding sinker jack 100 and pushes the latter downwardly to the position shown in Fig. 20, thus preventing the sinker jack from encountering the cam 101. Jacks not so depressed by the chain indications $I^6$ are elevated by means of a roller 104 so as to come into contact with the cam 101, and thus cause the corresponding sinkers to operate.

Obviously other utilities of the improved pattern chain will occur to those interested in the pattern control of mechanical elements, it being understood that while the application of the improved chain has herein been illustrated, by way of example, as applied to various parts and instrumentalities of a knitting machine, it is equally useful in other relationships, and not only in textile machinery (for example for selective warp feeding in a loom) but in other machines and mechanisms where pattern selection is desired.

It is further to be understood that the invention is not to be limited to the precise arrangement here illustrated and described, but is to be regarded as broadly inclusive of all equivalents thereof.

I claim:

1. Pattern mechanism of the kind in which a chain, comprising independent, pivotally united links, carries pattern indications, characterized in that the chain is longitudinally and transversely flexible and in having a rotary storage drum upon which the inactive portion of the chain is helically coiled upon its inner edge.

2. Pattern mechanism of the kind in which a chain, comprising a series of independent links united at their adjacent ends by pivot elements, carries pattern indications and wherein a rotary storage drum receives the inactive portion of the chain disposed in a helical coil, characterized in that the axes of the pivot elements are substantially parallel to the axis of the coil, and further characterized in that the chain-receiving portion of the drum has longitudinally extending link-positioning elements equally spaced about its periphery and in that each chain link has a complemental positioning element at its inner edge.

3. Pattern mechanism of the kind in which a chain, comprising independent pivotally united links, carries pattern indications and wherein a rotary storage drum receives the inactive portion of the chain disposed in a helical coil, characterized in that the chain-receiving portion of the drum has longitudinally extending link-positioning ribs equally spaced about its periphery so as to define a series of grooves and in that each link of the chain has a projecting tooth at its inner edge designed to fit within the grooves of the drum.

4. Pattern mechanism of the kind in which a chain, comprising independent pivotally united links, carries pattern indications and wherein a rotary storage drum receives the inactive portion of the chain disposed in a helical coil, characterized in that the chain-receiving portion of the drum has longitudinally extending link-positioning ribs equally spaced about its periphery and wherein each link of the chain has at least one notch in its inner edge designed to receive a rib of the drum.

5. Pattern mechanism of the kind in which a chain, comprising independent pivotally united links, carries pattern indications and wherein a rotary storage drum receives the inactive portion of the chain disposed in a helical coil, characterized in that the chain-receiving portion of the drum has longitudinally extending link-positioning elements each of which extends as a steep partial helical turn upon the surface of the drum, such elements being substantially parallel and equally spaced apart, and in which certain at least of the chain links each has an element at its inner edge designed to cooperate with one of the link-positioning elements of the drum.

6. Pattern mechanism of the kind in which a chain, comprising independent pivotally united links, carries pattern indications and wherein a rotary storage drum receives the inactive portion of the chain disposed in a helical coil, characterized in that the chain-receiving portion of the drum has longitudinally extending link-positioning elements spaced about its periphery, each of said elements forming a steep partial helical turn, the drum comprising means whereby the pitch of such elements may be varied at will, certain at least of the chain links each having an element at its inner edge constructed and arranged to cooperate with the positioning elements on the drum.

7. Pattern mechanism of the kind in which a chain, comprising independent pivotally united links, carries pattern indications and wherein a rotary storage drum receives the inactive portion of the chain disposed in a helical coil, characterized in that the chain-receiving portion of the drum has longitudinally extending link-positioning ribs equally spaced about its periphery, each rib forming a steep partial helical turn, and means effective simultaneously to vary the pitch of said ribs at will, certain at least of the chain links each having an element cooperable with said positioning elements of the drum thereby accurately to position the links upon the drum.

8. Pattern mechanism of the class described, including a chain and a driving drum upon which the inactive portion of the chain is stored in a helical coil, said drum including a barrel and a head at each end of the barrel, one at least of the heads being relatively adjustable with reference to the barrel, each head having a series of equally spaced openings disposed in a circle concentric with the barrel, said circles being of slightly greater diameter than the outer diameter of the barrel, and a series of stiffly flexible rods each extending from an opening in one head to a corresponding opening in the other head, said rods constituting link-positioning means for the chain.

9. Pattern mechanism of the kind wherein an endless pattern chain carrying pattern indications is employed for the direct pattern control of machine parts, characterized in that the chain is flexible transversely of its width, and in having a guide wheel for the chain adjacent to the point at which its indications perform their intended function, and in having a storage drum about which an inactive portion of the chain is helically coiled upon its inner edge, the axes of the guide wheel and drum being disposed in intersecting planes.

10. Pattern mechanism of the kind wherein an endless pattern chain carrying pattern indications is employed for the direct pattern control of machine parts, characterized in that the chain is flexible transversely of its width, and in having a guide wheel for the chain adjacent to the point at which its indications perform their intended function, and in having a storage drum about which an inactive portion of the chain is helically coiled upon its inner edge, and further characterized in having fixed curved chain guides operative to guide the chain in approaching said guide wheel and in its approach to the drum, respectively.

11. Pattern mechanism of the kind wherein an endless pattern chain carrying pattern indications is employed for the direct pattern control of machine parts, characterized in that the chain is flexible transversely of its width, and in having a chain driving and storage drum about which an inactive portion of the chain is stored in a helical coil upon its inner edge, the drum and chain having complemental cooperating parts operative to ensure accuracy of coiling of the chain upon the drum and its delivery therefrom, and means for driving the drum in accurate consonance with the machine whose parts are controlled by the pattern indications.

12. Pattern mechanism of the kind wherein an endless pattern chain carrying pattern indications is employed for the direct pattern control of machine parts, characterized in that the chain is flexible transversely of its width, and in having a guide wheel for the chain adjacent to the point at which its indications perform their intended function and in having a storage drum about which an inactive portion of the chain is helically coiled upon its inner edge, and further characterized in having an adjustable idler wheel about which the chain passes and which may be adjusted to take up slack in the chain.

13. Pattern mechanism useful for the direct control of parts of a knitting machine and wherein a pattern chain carries indications at one edge operative by direct contact with said knitting machine parts, characterized in that the chain is longitudinally and transversely flexible so that it may operatively approach said parts while moving along a path having components extending transversely of the width of the chain.

14. Pattern mechanism useful for the direct control of parts of a knitting machine and wherein a pattern chain carries indications operative by direct contact with said knitting machine parts, characterized in that the chain is transversely flexible and in having a guide wheel closely adjacent to the machine parts which are to be controlled and about which the chain passes, said guide wheel including elements cooperable with parts of the knitting machine thereby to ensure accuracy of timing of the chain and the machine parts.

15. Pattern mechanism useful for the direct selective control of a moving series of knitting instrumentalities in a knitting machine and wherein an endless pattern chain carries indications operative by direct contact with said knitting instrumentalities to move the latter, characterized in that the chain is flexible transversely of its width and comprises links each having a tooth at its inner edge, and a guide wheel for the chain having peripherally arranged elements for engagement with the teeth of the chain links and having other peripherally arranged elements operative to engage successive knitting instrumentalities and thereby ensure accurate timed relation between the chain and the knitting instrumentalities.

16. Pattern mechanism of the kind in which a chain carrying pattern indications comprises a series of independent links and pivot means uniting each link to the next link of the series, characterized in that the links and pivotal connections are so constructed and arranged that the chain may be flexed about an axis which is perpendicular to the plane defined by the axes of the pivots at opposite ends of any selected link.

17. Pattern mechanism of the kind in which a chain carrying pattern indications comprises independent links and pivot means uniting each link to the next link of the series, characterized in that each link is flexible about an axis perpendicular to the plane defined by the axes of the pivots at its opposite ends, whereby the chain is free to move, without cramping, along a helical path.

18. Pattern mechanism of the kind in which a chain carrying pattern indications comprises independent links and means pivotally uniting them, characterized in that the links are of thin, flexible sheet metal and have wide faces and narrow edges, the wide faces of adjacent links overlapping at their ends, and a tubular rivet pivotally uniting the overlapped ends of adjacent links, the chain being flexible to bend transversely by reason of the pivotal connections between the links and being also flexible transversely in a direction at right angles to the direction of said first flexing by reason of the flexibility of its individual links.

19. Pattern mechanism of the kind in which a chain carrying pattern indications comprises a series of independent links and pivot means uniting each link to the next link of the series, characterized in that the links are thin, have wide faces and narrow edges, and are flexible in a plane perpendicular to the plane defined by the pivotal axes at opposite ends of the link, each link having an element at its thin edge designed for meshing engagement with chain-guiding means.

20. Pattern mechanism of the kind in which a chain carrying pattern indications comprises independent links and pivot means uniting adjacent ends of the links of the series, characterized in that the links are thin and have wide faces and narrow edges, the wide faces overlapping at the pivot connections and the links being transversely flexible so that their wide faces may be bent to form arcs, each link having a tooth at its inner edge designed to mesh with a complemental socket in a chain-guiding wheel.

21. Pattern mechanism of the kind in which a chain carrying pattern indications comprises independent links and means pivotally uniting them, characterized in that the links are thin, each having a wide face and a narrow edge, each link being transversely flexible so that its wide face can be bent to arcuate form between its ends, each link having an element at its inner edge designed for interengagement with a complemental element of chain-driving means, certain at least of the links each having a pattern indication at its outer edge.

22. An endless pattern chain for use in a pattern mechanism, said chain comprising a series of independent connected links, the links being thin and flexible and having wide faces and narrow edges, and pivotal means uniting each link to the next link of the series, the axes of the pivot means being substantially perpendicular to the wide faces of the links.

23. A pattern chain for use in a pattern mechanism, said chain comprising links which are thin and flexible transversely of the width of the chain and have wide faces and narrow edges, and tubular rivets uniting the ends of adjacent links, the axes of the links being perpendicular to the wide faces of the links.

24. A mutable-link pattern chain for use in a pattern mechanism, said chain comprising a series of thin, blade-like, flexible, interchangeable links, the end portions of the wide faces of adjacent links being overlapped, and means normally pivotally uniting the overlapped ends of adjacent links, the links being separable by removal of said pivotal connecting means.

25. A mutable-link pattern chain for use in a pattern mechanism, said chain comprising a series of thin, blade-like, transversely flexible, interchangeable links, the end portions of the wide faces of adjacent links being overlapped, and pivotal means normally uniting the overlapped ends of adjacent links, said pivot means being so devised and arranged as substantially to eliminate lost motion between the united links.

26. Pattern mechanism of the kind wherein an endless pattern chain comprising a series of pivotally united links carries pattern indications at one edge which are employed for the direct pattern control of the machine parts, characterized in that the chain is flexible not only by relative movements of its constituent links about the pivot axes, but is also flexible about an axis perpendicular to the plane defined by the pivot axes of opposite ends of any selected link, and further characterized in having means which guides the chain to move in a path including portions in which the chain is flexed in both of the aforesaid directions.

CORNELIUS A. CRIMMINS.